(12) United States Patent
Zimmerman et al.

(10) Patent No.: US 6,805,078 B2
(45) Date of Patent: Oct. 19, 2004

(54) LIVESTOCK WEIGHING AND SORTING APPARATUS

(75) Inventors: Raymond G. Zimmerman, Ephrata, PA (US); Harry H. Sauder, New Holland, PA (US); Glen M. Zimmerman, New Holland, PA (US)

(73) Assignee: Raytec, LLC, Ephrata, PA (US)

( * ) Notice: Subject to any disclaimer, the term of this patent is extended or adjusted under 35 U.S.C. 154(b) by 20 days.

(21) Appl. No.: 10/410,849

(22) Filed: Apr. 10, 2003

(65) Prior Publication Data

US 2003/0192487 A1 Oct. 16, 2003

Related U.S. Application Data

(60) Provisional application No. 60/371,470, filed on Apr. 10, 2002.

(51) Int. Cl.[7] ................................................ A01K 5/00
(52) U.S. Cl. ..................................................... 119/842
(58) Field of Search ............................... 119/842, 840, 119/841, 843

(56) References Cited

U.S. PATENT DOCUMENTS

| | | | |
|---|---|---|---|
| 3,583,367 A | 6/1971 | Sapp et al. .................. | 119/155 |
| 4,134,366 A | * 1/1979 | Elliott ......................... | 119/842 |
| 4,138,968 A | 2/1979 | Ostermann .................. | 119/155 |
| 4,261,297 A | 4/1981 | Van Maarion et al. ...... | 119/155 |
| 4,280,448 A | 7/1981 | Ostermann .................. | 119/155 |
| 4,288,856 A | 9/1981 | Linseth ........................ | 364/567 |
| 4,336,768 A | 6/1982 | Wagner ....................... | 119/155 |
| 5,579,719 A | 12/1996 | Hoff et al. ............... | 119/51.02 |
| 6,239,711 B1 | 5/2001 | Downey et al. ............ | 340/666 |

* cited by examiner

*Primary Examiner*—Yvonne Abbott
(74) *Attorney, Agent, or Firm*—Michael R. Swartz; John R. Flanagan

(57) ABSTRACT

A livestock weighing and sorting apparatus includes a frame, a weighing station supported by the frame and defining inlet and outlet openings and a passageway extending therebetween for permitting an animal to go through the weighing station and be weighed while therein, dual inlet gates mounted to the frame side-by-side one another adjacent to the inlet opening and movable toward and away from each other between opened and closed positions, a first actuator mechanism actuatable to move the dual inlet gates between the opened and closed positions, an outlet sort gate mounted to the frame adjacent to the outlet opening and movable between a centered closed position and either a first opened position or a second opened position, and a second actuator mechanism actuatable to move the outlet sort gate between the centered closed position and either the first or second opened positions.

36 Claims, 14 Drawing Sheets

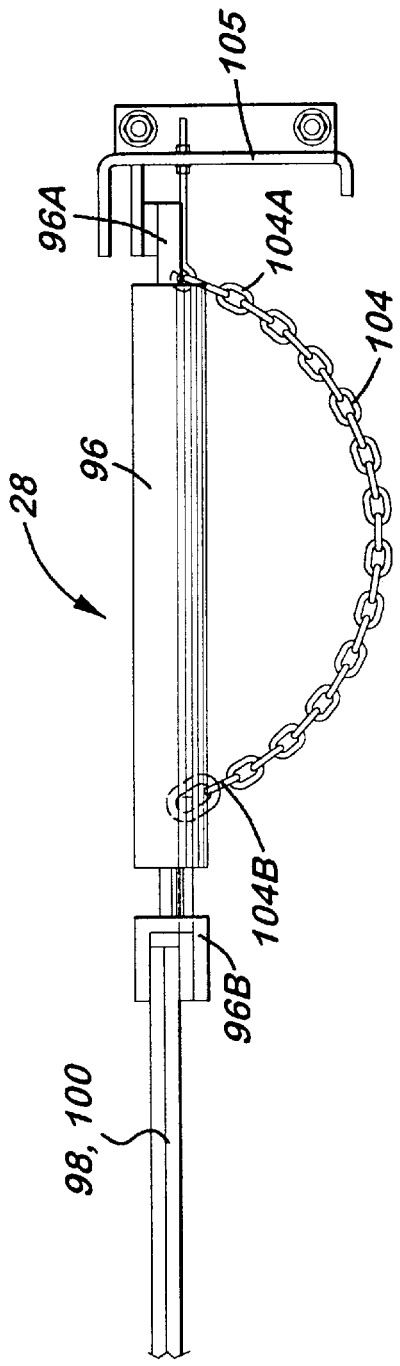
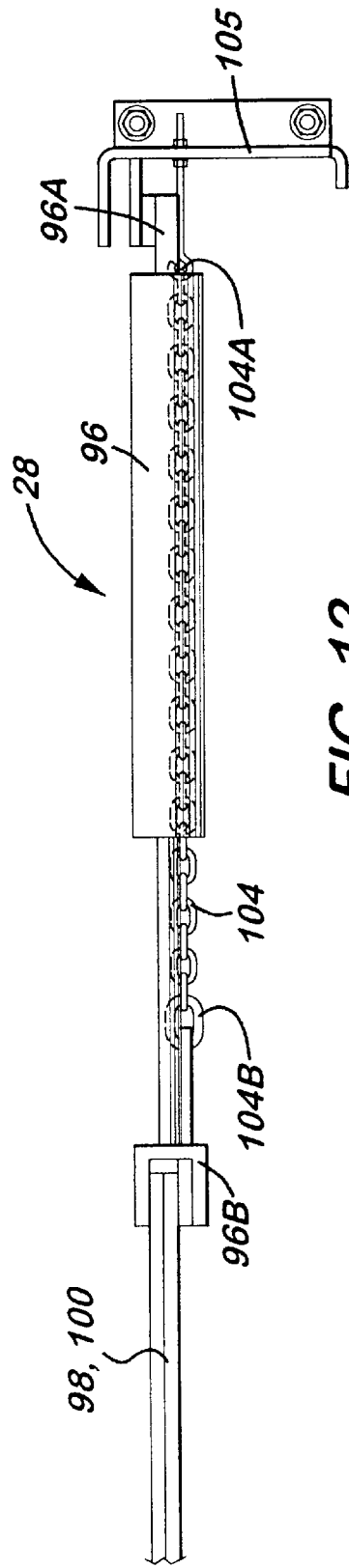

LIVESTOCK WEIGHING AND SORTING APPARATUS

This patent application claims the benefit of U.S. provisional application No. 60/371,470 filed Apr. 10, 2002.

BACKGROUND OF THE INVENTION

1. Field of the Invention

The present invention generally relates to automatic sorting of livestock by weight and, more particularly, is concerned with a livestock weighing and sorting apparatus.

2. Description of the Prior Art

It is a common practice in the livestock industry to closely monitor the weight of various animals and then sort or segregate them based upon a predetermined weight which will provide a maximum financial return under prevailing market conditions. This is especially the common practice in the pig or hog raising industry.

Various prior art systems have been developed for weighing animals taken one at a time from one enclosure and then sorting the weighed animals into one or the other of a pair of enclosures or pens depending on whether or not the respective animals have reached a predetermined weight. Representative examples of these prior art systems are disclosed in U.S. Pat. Nos. 4,138,968 and 4,280,448 to Ostermann and U.S. Pat. No. 6,239,711 to Downey et al.

While these prior art systems may be satisfactory in use for the specific purposes for which they were designed, none of them appear to provide a comprehensive optimum design for meeting the objective of weighing animals and then sorting them based on their weight. Consequently, a need still exists for an innovation which will more nearly provide an optimum design for meeting the aforementioned objective.

SUMMARY OF THE INVENTION

The present invention provides a livestock weighing and sorting apparatus designed to satisfy the aforementioned need. The livestock weighing and sorting apparatus of the present invention is a more cost-effective comprehensive approach, than the prior art, to meeting the aforementioned objective.

Accordingly, the present invention is directed to a livestock weighing and sorting apparatus which comprises: (a) a frame having opposite entry and exit ends; (b) a weighing station supported by the frame and having an inlet opening and an outlet opening spaced apart from one another and disposed adjacent to the respective opposite entry and exit ends of the frame, the weighing station defining a passageway extending between the inlet and outlet openings and the entry and exit ends for permitting an animal to go through the passageway from the respective inlet opening and entry end to the respective outlet opening and exit end of the weighing station and frame and to be weighed as the animal is present in the weighing station; (c) dual inlet gates mounted to the frame side-by-side one another and disposed at the entry end of the frame and adjacent to the inlet opening of the weighing station for undergoing pivotal movement toward and away from each other between opened and closed positions relative to the inlet opening of the weighing station and the entry end of the frame; (d) a first actuator mechanism coupled between the frame and the dual inlet gates and being actuatable to move the dual inlet gates between the opened and closed positions to correspondingly permit and prevent entry of an animal from a livestock supply area through the entry end of the frame and the inlet opening of the weighing station into the passageway of the weighing station; (e) an outlet sort gate mounted to the frame and disposed adjacent to the outlet opening of the weighing station for undergoing pivotal movement between closed and opened positions relative to the outlet opening of the weighing station and the exit end of the frame; (f) a second actuator mechanism coupled between the frame and the outlet sort gate and being actuatable to move the outlet gate between the closed and opened positions to correspondingly prevent and permit exit of the animal through the outlet opening of the weighing station from the passageway thereof to exterior heavy and light livestock sort areas; and (g) means for controlling operation of the weighing station and actuation of the first and second actuator mechanisms and thereby opening and closing of the inlet gate and outlet sort gate in response to operation of the weighing station.

The present invention also is directed to a livestock weighing and sorting apparatus which comprises: (a) a frame having opposite entrance and exit ends; (b) a weighing station supported by the frame and having an inlet opening and an outlet opening spaced apart from one another and disposed adjacent to the respective opposite entry and exit ends of the frame, the weighing station defining a passageway extending between the inlet and outlet openings and the entry and exit ends for permitting an animal to go through the passageway from the respective inlet opening and entry end to the respective outlet opening and exit end of the weighing station and frame and to be weighed as the animal is present in the weighing station; (c) an inlet gate assembly mounted to the entry end of the frame and adjacent to the inlet opening of the weighing station for undergoing movement between opened and closed positions relative to the inlet opening of the weighing station; (d) a first actuator mechanism coupled between the frame and the inlet gate assembly and being actuatable to move the inlet gate assembly between the opened and closed positions to correspondingly permit and prevent entry of the animal from a livestock supply area through the entry end of the frame and the inlet opening of the weighing station into the passageway thereof; (e) an outlet sort gate mounted to the frame and disposed adjacent to the outlet opening of the weighing station for undergoing pivotal movement from a centered closed position to a first opened position or a second opened position relative to the outlet opening of the weighing station and the closed centered position, the outlet sort gate including a central panel portion having a pair of opposite ends, a pivot shaft disposed at one of the opposite ends for pivotal mounting of the outlet sort gate, and an end portion disposed at another of the opposite ends and extending in transverse relation to the central panel portion, the end portion being disposed across the outlet opening of the weighing station when the outlet sort gate is at the closed centered position, the outlet sort gate being pivotally moved and disposed to one side of the outlet opening when in the first opened position relative to the outlet opening, the outlet sort gate being pivotally moved and disposed to an opposite side of the outlet opening when in the second opened position relative to the outlet opening; (f) a second actuator mechanism coupled between the frame and the outlet sort gate and being actuatable to move the outlet gate between the centered closed position and the first or second opened positions to correspondingly prevent and permit exit of the animal through the outlet opening of the weighing station from the passageway thereof to exterior heavy and light livestock sort areas; and (g) means for controlling operation of the weighing station and actuation of the first and second actuator mechanisms and thereby opening and closing of the inlet gate assembly and outlet sort gate in response to operation of the weighing station.

And further, the present invention is also directed to a method of automatically weighing and sorting livestock by weight by permitting an animal to pass through a livestock weighing and sorting apparatus that includes a weighing station having an inlet opening and an outlet opening defining a passageway extending therethrough and a weighing scales associated therewith, dual inlet gates disposed at the inlet opening and mounted for undergoing pivotal movement by a first actuator mechanism toward and away from each other between an open position wherein an animal may move forwardly through the inlet opening and into the passageway and a closed position relative to the inlet opening wherein an animal is prevented from moving rearwardly from the passageway once within the passageway, and an outlet sort gate disposed adjacent to the outlet opening and mounted for undergoing pivotal movement by a second actuator mechanism between a closed position wherein an animal within the passageway is prevented to exit the passageway through the exit opening and an open position relative to the outlet opening wherein an animal within the passageway is permitted to exit the passageway forwardly through the outlet opening, comprising the steps of: (a) actuating the first actuator mechanism to pivotally move the dual inlet gates away from one another to an open position and actuating the second actuator to a closed position so as to permit an animal to pass through the inlet opening and into the passageway and to be prevented from exiting the passageway by moving further forwardly through the outlet opening; (b) detecting the presence of an animal within the passageway; (c) actuating the first actuator mechanism to pivotally move the dual inlet gates toward one another from an open to a closed position so as to trap an animal within the passageway between the closed inlet and outlet openings; (d) ensuring the dual inlet doors have been moved by the first actuator mechanism to the closed position; (e) perform the weighing process of the animal within the passageway by operation of the weighing scales for a predetermined time interval to calculate the weight of the animal and record the weight measurement; (f) after the weight of the animal has been calculated and recorded, actuating the second actuator mechanism to pivotally move the outlet sort gate from the closed position to an open position so as to permit the weighed animal to exit the passageway through the outlet opening; and (g) repeat steps (a) through (f) above for weighing successive animals, one at a time. Detection of an animal with the passageway can either be accomplished either through the use of a detector device locating within the weigh station that physically detects the presence of an animal or by setting the weighing scales to a predetermined weight value which would thereby detect the presence of an animal within the passageway. To ensure that the dual inlet gates are in their closed position before the weighing calculation process begins, sensor in association with the first actuator mechanism or in association with the dual inlet gates is employed.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which:

FIG. 11 is an enlarged side elevational view of the first actuator mechanism as seen along line 11—11 of FIG. 8, showing the first actuator mechanism in the retracted condition.

FIG. 12 is another enlarged side elevational view of the first actuator mechanism as seen along line 12—12 of FIG. 9, showing the first actuator mechanism in the extended condition.

DETAILED DESCRIPTION OF THE INVENTION

Figure 1:
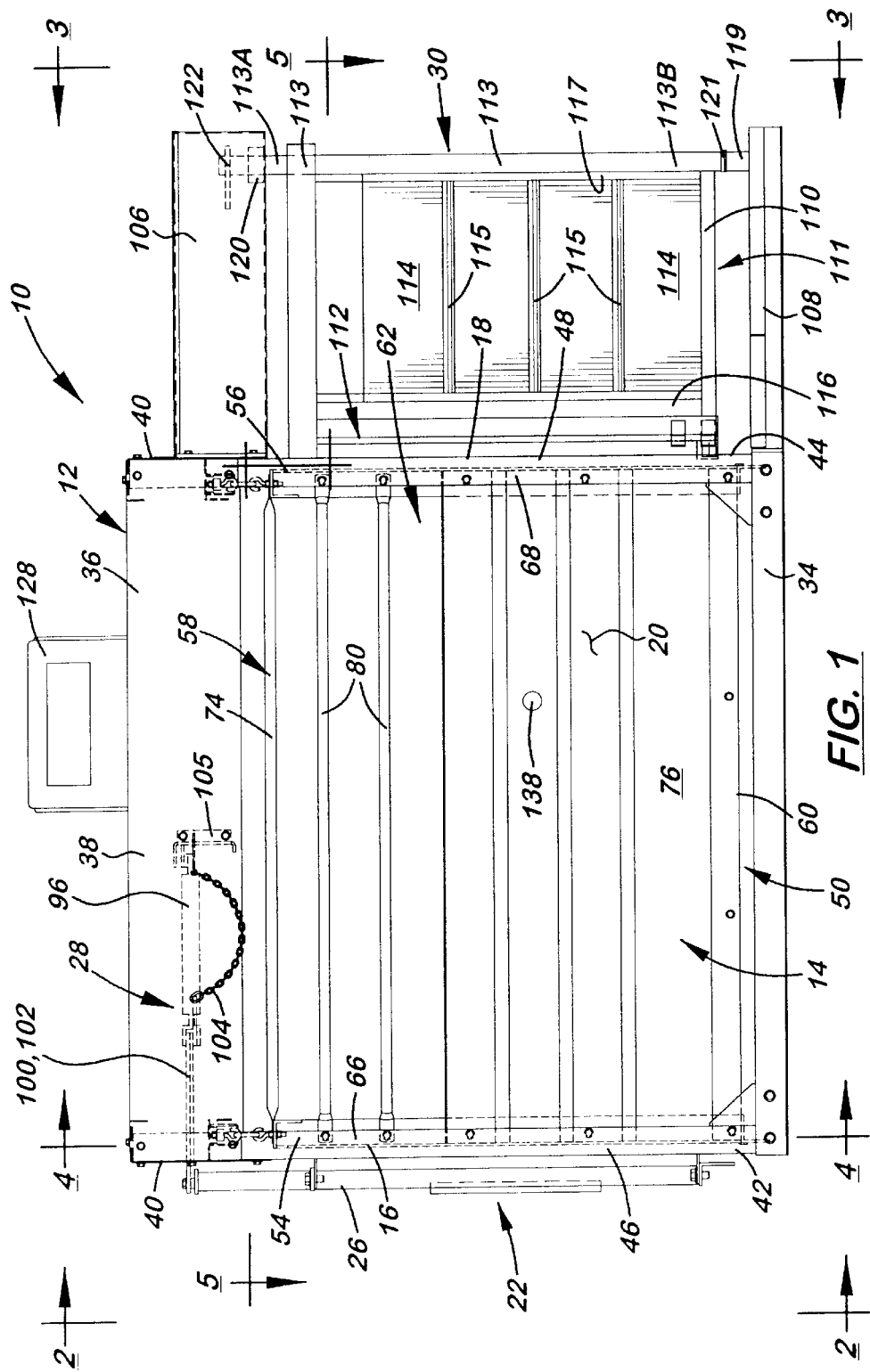
FIG. 1 is a side elevational view of a livestock weighing and sorting apparatus of the present invention.
Figure 2:
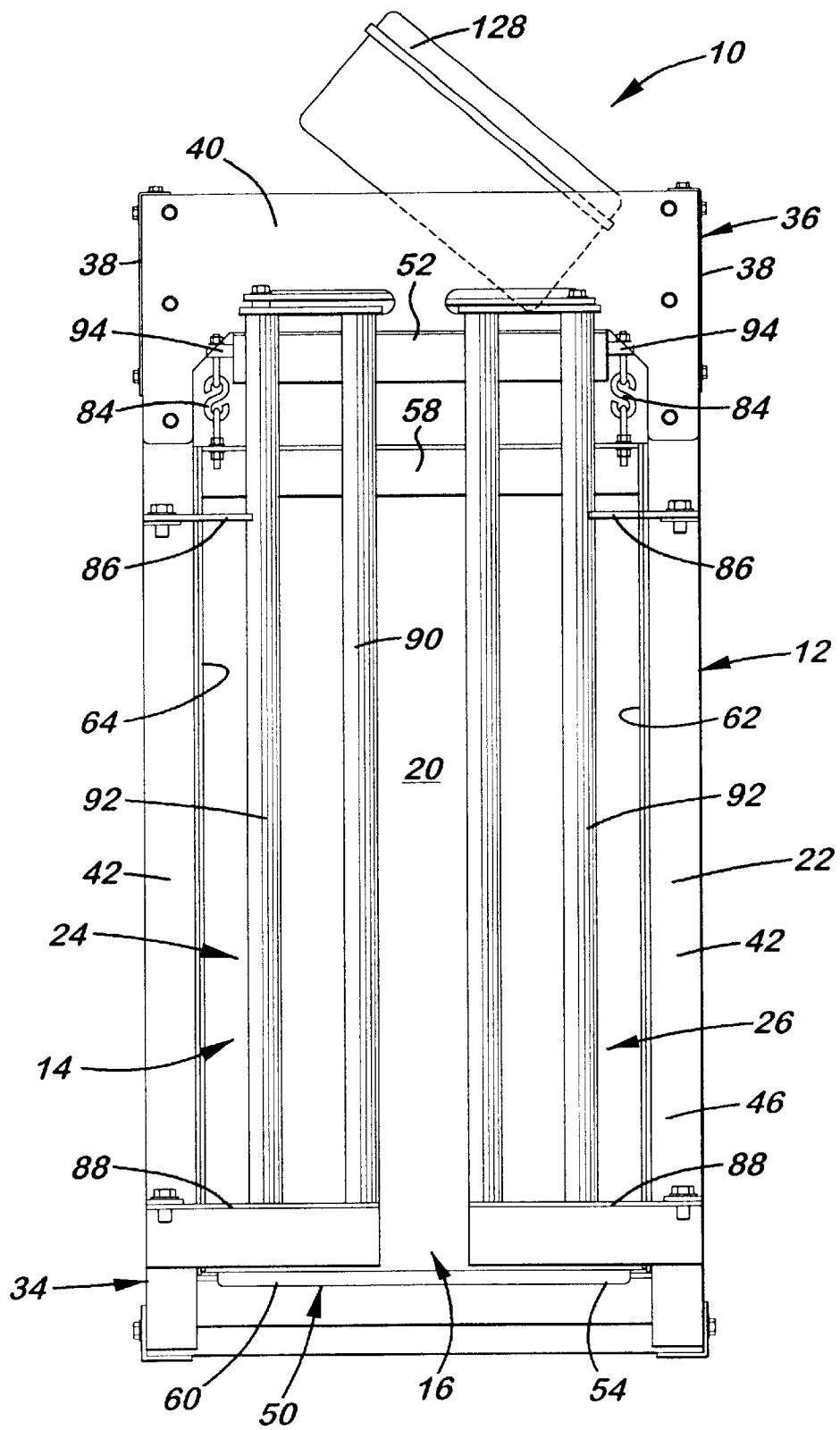
FIG. 2 is an enlarged elevational view of an entry end of the apparatus as seen along line 2—2 of FIG. 1, showing dual inlet gates of the apparatus.
Figure 3:
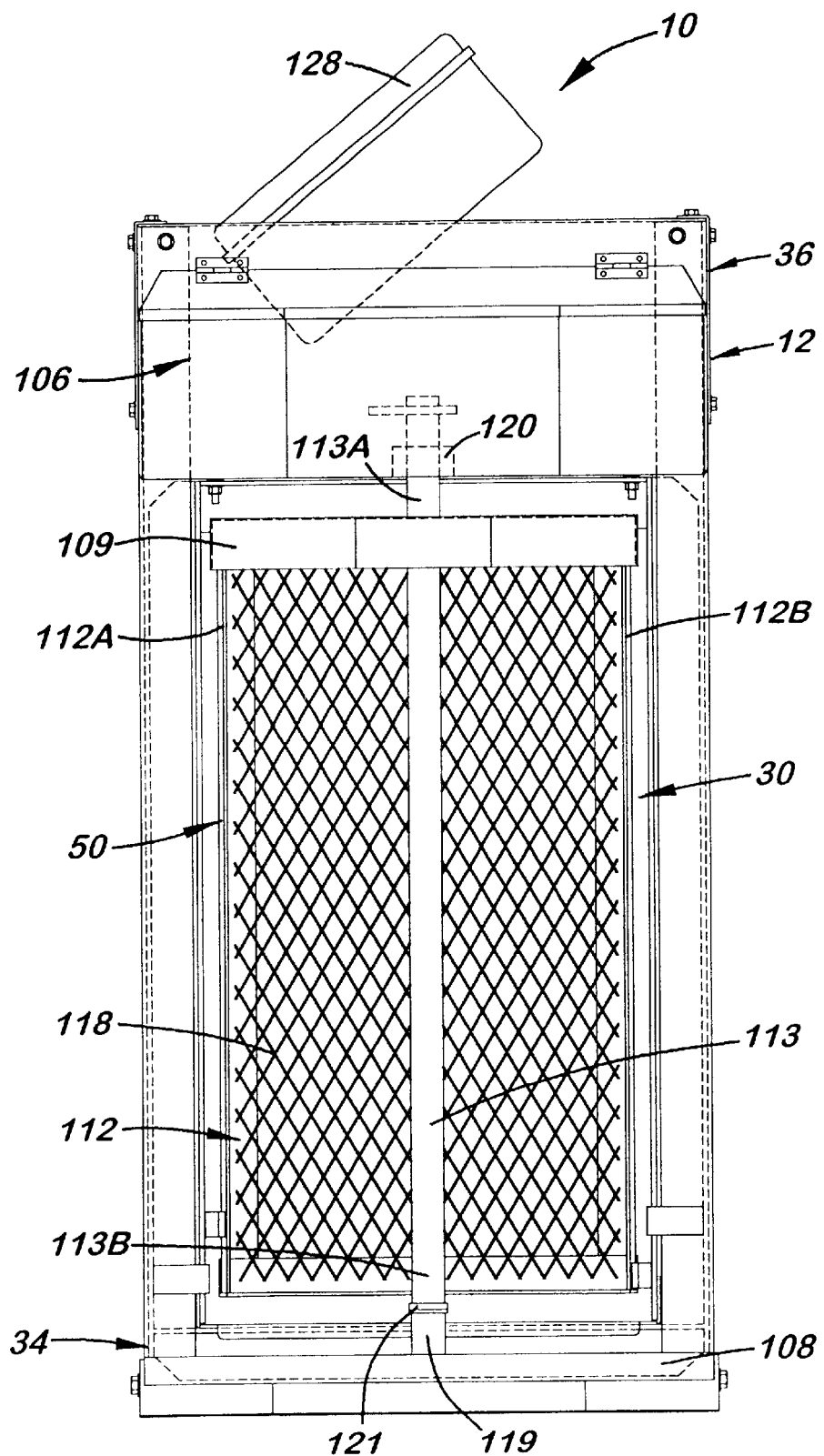
FIG. 3 is an enlarged elevational view of an exit end of the apparatus as seen along line 3—3 of FIG. 1, showing a T-shaped outlet sort gate of the apparatus.

Referring to the drawings and particularly to FIGS. 1 to 5, there is illustrated a livestock weighing and sorting apparatus, generally designated 10, of the present invention. The apparatus 10 basically includes a frame 12, a weighing station 14 operatively supported by the frame 12 and defining inlet and outlet openings 16, 18 and a passageway 20 extending therebetween for permitting an animal A, such as a pig, to go through the weighing station 14 and be weighed while therein, an inlet gate assembly 22 formed by dual right and left inlet gates 24, 26 pivotally mounted side-by-side one another to the frame 12 and disposed adjacent to the inlet opening 16 of the weighing station 14 and being pivotally movable toward and away from each other between opened and closed positions (as seen respectively in FIGS. 13 and 14), a first actuator mechanism 28 mounted between the frame 12 and dual inlet gates 24, 26 and being actuatable to move the dual inlet gates 24, 26 between the opened and closed positions, a generally T-shaped outlet sort gate 30 (described in further detail later on) is pivotally mounted to the frame 12 and disposed adjacent to the outlet opening 18 of the weighing station 14 and being pivotally movable between a centered closed position (as seen in FIGS. 13 and 14) and either a first opened position (as seen in FIG. 15) or a second opened position (as seen in FIG. 16), and a second actuator mechanism 32 (FIG. 13) mounted between the frame 12 and the outlet sort gate 30 and being actuatable to pivotally move the outlet sort gate 30 between the centered closed position and either the first or second opened positions.

More particularly, the frame 12 of the apparatus 10 has a lower framework 34 of generally rectangular configuration, an upper framework 36 made up of opposite side and end plates 38, 40 and opposite end pairs of upright frame members 42, 44 spaced from one another and extending upright between and fixedly connected at opposite pairs of corners of the frame 12 with the lower and upper frameworks 34, 36. The pairs of upright frame members 42, 44 form therebetween opposite entry and exit ends 46, 48 of the frame 12.

The weighing station 14 of the apparatus 10 includes a cage 50 and a plurality of load cells 52. The cage 50 has a generally rectangular configuration formed by a pair of opposite inlet and outlet ends 54, 56, a top 58, a bottom platform 60, and a pair of opposite lateral sides 62, 64. Each end 54, 56 takes the form of pairs of vertical corner members 66, 68, The top 58 takes the form of a pair of horizontal end members 70, 72 and a plurality of horizontal tubes 74 extending between and fastened to the horizontal end members 70, 72. The respective horizontal end members 70, 72 also extend between and are fastened to the pairs of vertical corner members 66, 68. The opposite lateral sides 62, 64 are made up of lower side panels 74, 76 and a plurality of vertically spaced upper tubes 80, 82 extending between and connected to the vertical corner members 66, 68. The inlet opening 16 and outlet opening 18 of the weighing station 14 are defined at the inlet and outlet ends 54, 56 of the cage 50 adjacent to the respective opposite entry and exit ends 46, 48 of the frame 12. The passageway 20 extends between the inlet and outlet openings 16, 18 of the cage 50 and the entry and exit ends 46, 48 of the frame 12 and also between the opposite lateral sides 62, 64 and over the bottom platform 60 for permitting an animal to go through the passageway 20 from the respective inlet opening 16 and entry end 46 to the respective outlet opening 18 and exit end 48 of the weighing station 14 and frame 12 and to be weighed as the animal is present in the weighing station 14. At least one and preferably a pair of the load cells 52 is stationarily mounted to the end plates 40 of the upper framework 36 of the frame 12 adjacent to each of the entry and exit ends 46, 48 and adjacent to the opposite inlet and outlet ends 54, 56 of the cage 50 such that the cage 50 is supported at its upper horizontal end members 70, 72 by S-shaped hooks 84 hanging from tabs 86 extending outwardly from the load cells 52.

Figure 9:
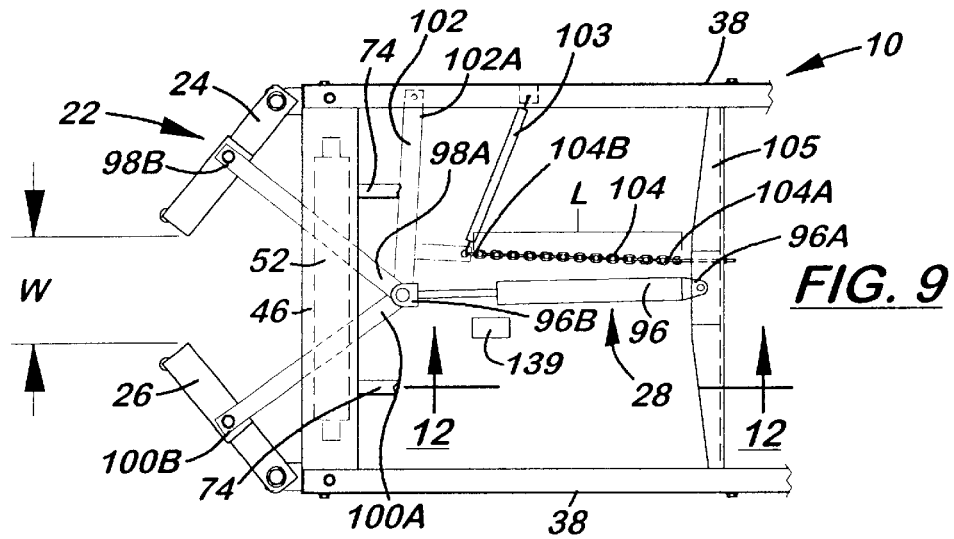
FIG. 9 is another top plan view of the apparatus similar to that of FIG. 8, now showing a first extended condition of the first actuator mechanism in which the dual inlet gates have been pivoted to and are held at a first selected opened position.
Figure 10:
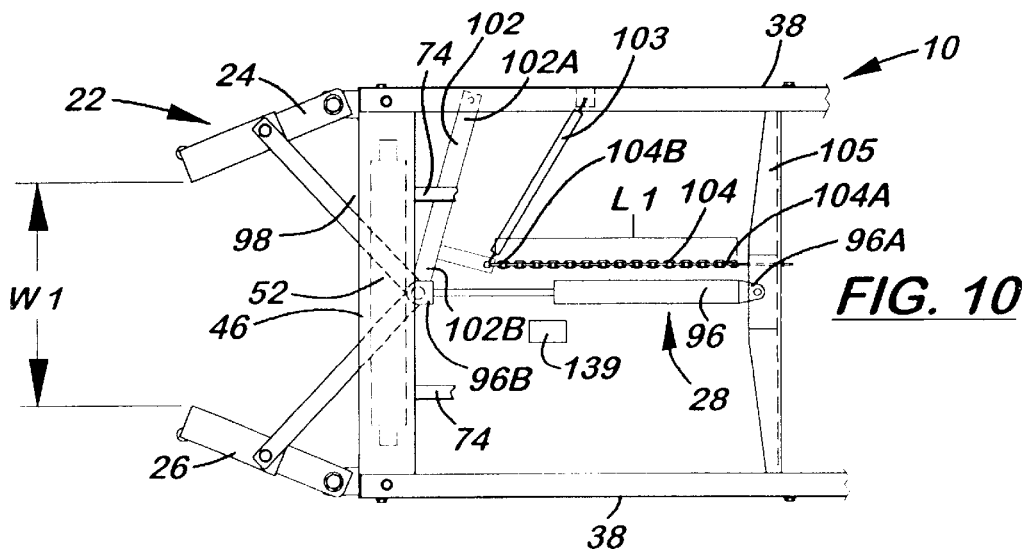
FIG. 10 is still another top plan view of the apparatus similar to that of FIG. 9, but showing a second extended condition of the first actuator mechanism in which the dual inlet gates have been pivoted to and are held at a second selected opened position in which the opening of the dual inlet gates is wider than in FIG. 9.
Figure 13:
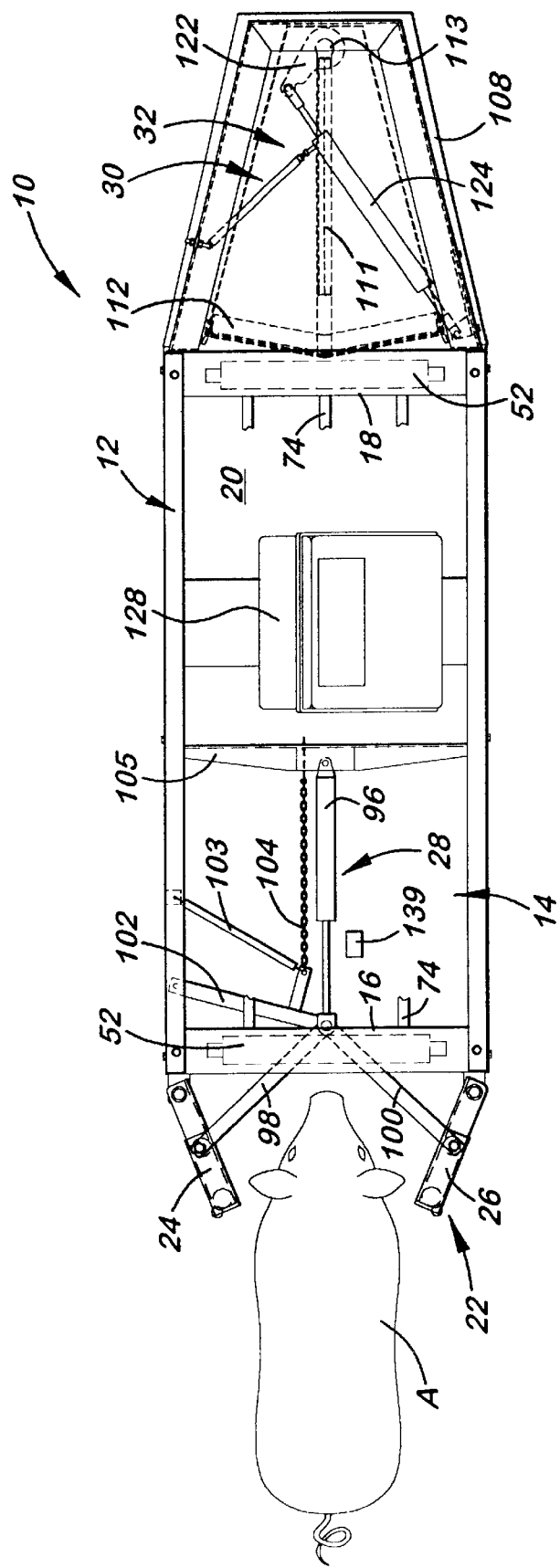
FIG. 13 is a top plan view of the apparatus of FIG. 1, showing the dual inlet gates in a selected one of a plurality of opened positions to provide an inlet opening into the weighing station of the apparatus with a width matching that of a pig to limit entry of only one pig at a time.
Figure 14:
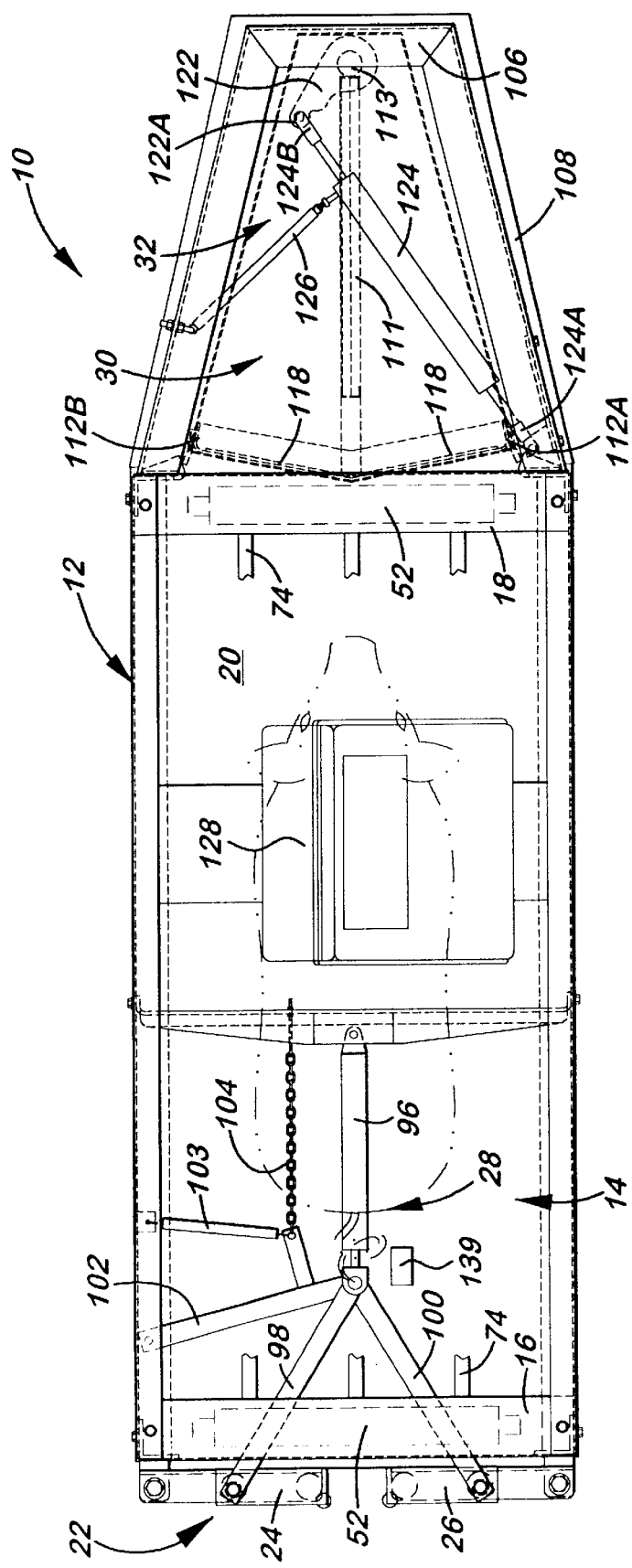
FIG. 14 is an enlarged top plan view of the apparatus similar to that of FIG. 13, but now showing the dual inlet gates and the outlet sort gate of the apparatus disposed in respective closed positions and a pig positioned in the weighing station of the apparatus between the inlet and outlet gates.
Figure 15:
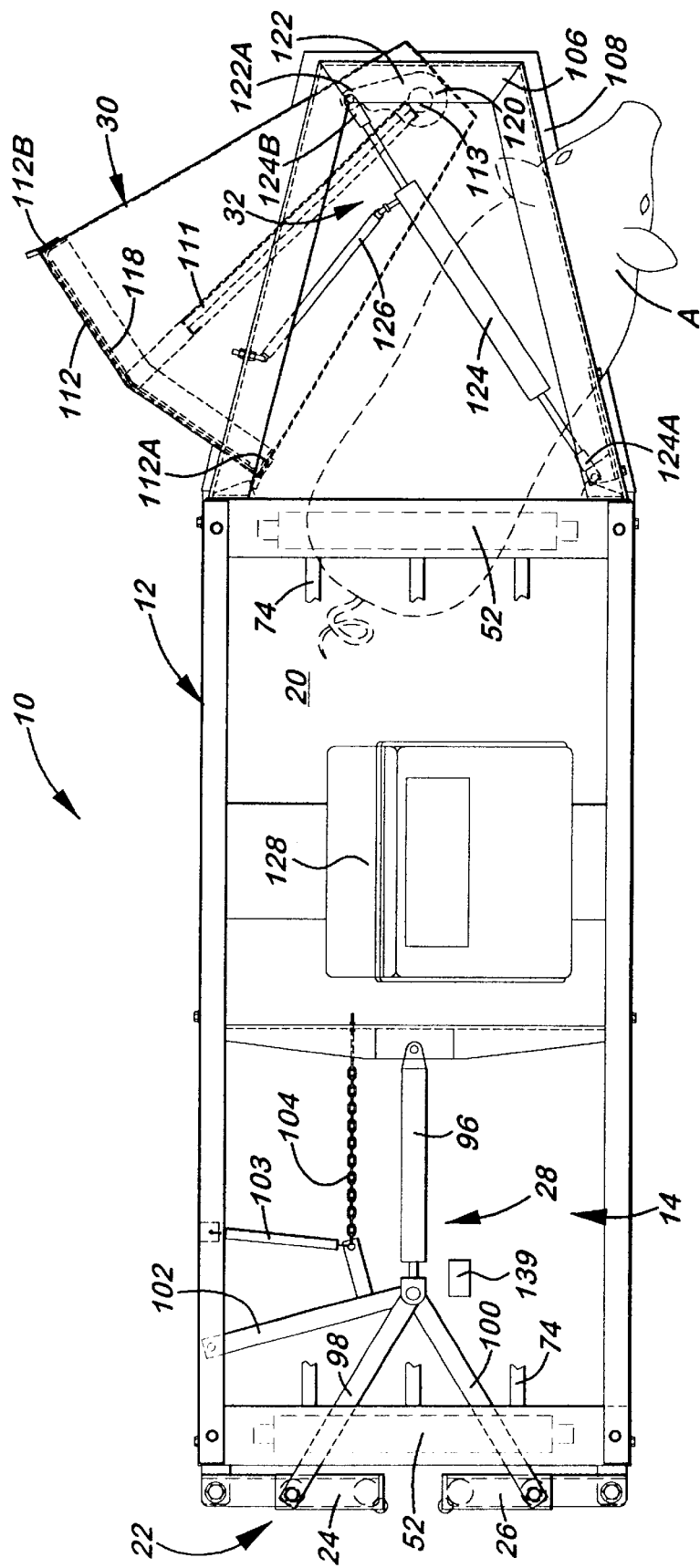
FIG. 15 is another top plan view of the apparatus similar to that of FIG. 13, but now showing the dual inlet gates in the closed position and the outlet sort gate in a first opened position.
Figure 16:
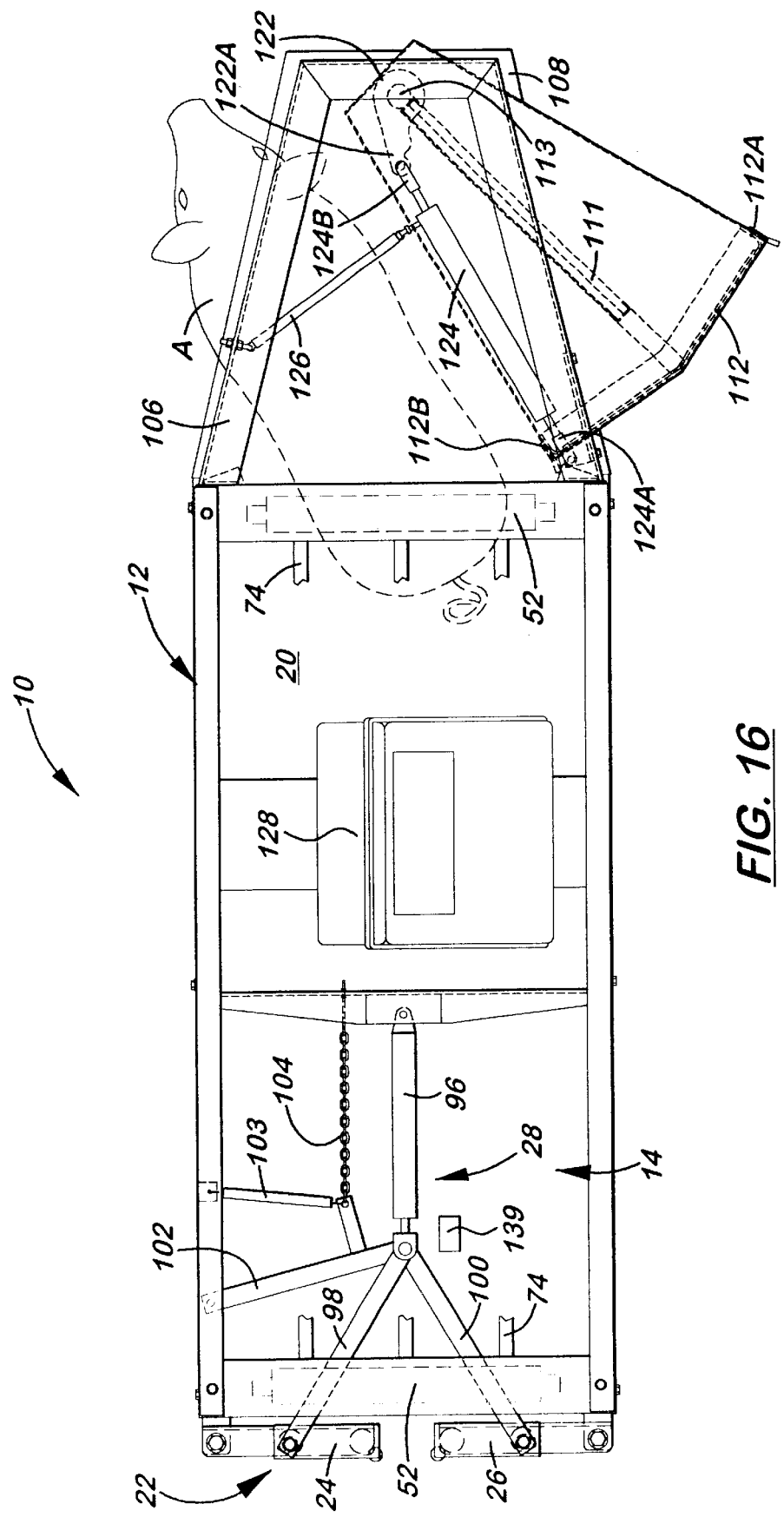
FIG. 16 is still another top plan view of the apparatus similar to that of FIG. 13, but now showing the outlet sort gate in a second opened position.

Referring to FIGS. 1, 2, 5 and 8–16, the dual right and left inlet gates 24, 26 of the inlet gate assembly 22 of the apparatus 10 respectively are pivotally mounted to the inlet pair of upright frame members 42 of the frame 12 disposed at the entry end 46 of the frame 12 adjacent to the inlet opening 16 of the cage 50. The dual inlet gates 24, 26 are capable of undergoing movement toward and away from each other between a closed position, as seen in FIGS. 1, 2, 5, 8 and 14–16, and an opened position, as seen in FIGS. 9, 10 and 13, relative to the inlet opening 16 of the cage 50. More particularly, each of the dual inlet gates 24, 26 includes upper and lower mounting members 86, 88 pivotally mounted to one of the upright frame members 42 of the frame 12, and a pair of upright tubular members 90, 92 extending between and attached to the upper and lower mounting members 86, 88.

Figure 18:
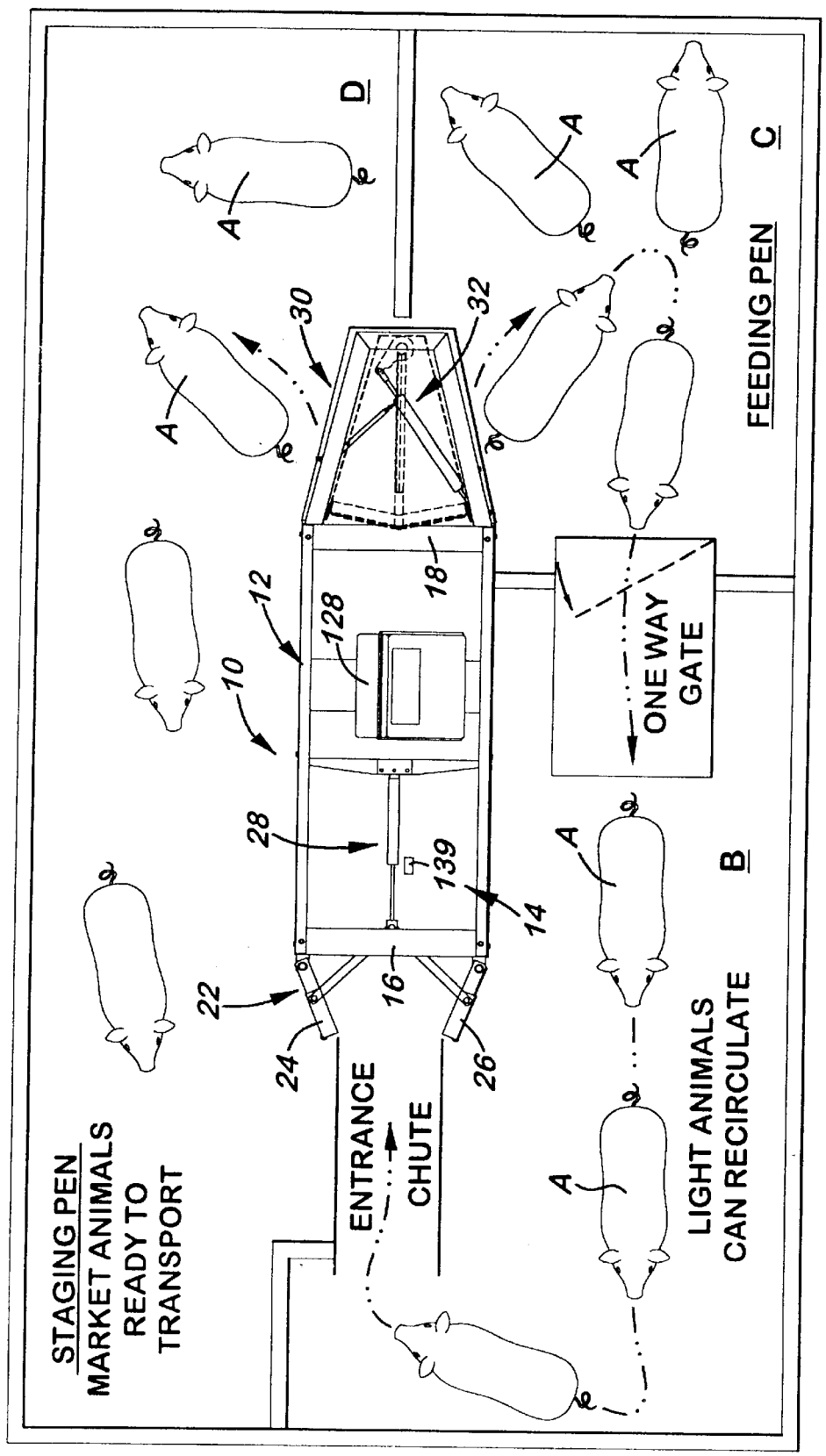
FIG. 18 is a diagram showing the apparatus of the present invention employed in conjunction with pens and one-way gates either for weighing and sorting heavy pigs into a staging pen where they are ready to transport to market or light pigs into a feeding pen where they continue feeding and can recirculate through the apparatus for subsequent weighing and sorting.

The first actuator mechanism 28 of the apparatus 10 extends between and is coupled to the frame 12 and the dual inlet gates 24, 26 and is actuatable to move the dual inlet gates 24, 26 between the opened and closed positions. Such movement correspondingly permits and prevents entry of the animal A from a livestock supply (or recirculation) area B, as seen in FIG. 18, through the entry end 46 of the frame 12 and the inlet opening 16 of the cage 50 into the passageway 20 thereof. More particularly, the first actuator mechanism 28 includes a single extendable and retractable actuator 96, such as a single acting pneumatic cylinder, a pair of elongated rigid links 98, 100, a rigid stabilizer link 102 and an inelastic flexible member 104 in the form of a link-type chain. The single actuator 96 has a pair of opposite ends 96A, 96B and is coupled at the one end 96A to a cross bracket 105 fixed to opposite side plates 38 of the upper framework 36 of the frame 12. The links 98, 100 each has a pair of opposite ends 98A, 98B and 10A, 100B and is pivotally coupled at one end 98A, 100A to the other end 96B of the single actuator 96 and pivotally coupled at the other end 98B, 100B to the respective one of the dual inlet gates 24, 26. The stabilizer link 102 has a pair of opposite ends 102A, 102B and is pivotally coupled at one end 102A to the frame 12 and is pivotally coupled at the other end 102B to the other end 96B of the single actuator 96. The inelastic flexible member 104 is disposed along the single actuator 96 and has a pair of opposite ends 104A, 104B. The inelastic flexible member 104 is connected at one end 104A to the cross bracket 105 of the frame 12 and at the other end 104B to the stabilizer link 102 so as to assume a slack condition, as seen in FIGS. 1 and 11, in response to the single actuator 96 being actuated to a retracted condition, as seen in FIGS. 1, 2, 8 and 14–16. The inelastic flexible member 104 assumes a taut condition, as seen in FIGS. 12 and 13, in response to the single actuator 96 being actuated to an extended condition, as seen in FIGS. 13, such that inelastic flexible member 104 has a predetermined length L between the ends 104A, 104B thereof when in the taut condition which defines a preselected width W between the dual inlet gates 24, 26 in the opened position. In its taut condition, the inelastic flexible member 104, in effect, provides a stop function to limit the extension of the single actuator 96. A spring 103 extends between and is connected to the member 104 and frame 12 so as to hold the member 104 away from the single actuator 96. Thus, the dual inlet gates 24, 26 are moved to the closed position in response to the single actuator 96 being actuated to the retracted condition and the dual inlet gates 24, 26 are moved to the opened position in response to single actuator 96 being actuated to the extended condition.

It should be pointed out that the predetermined length L between the ends 104A, 104B of the inelastic flexible member 104 can be increased, for instance to length L1 as seen in FIG. 10, or decreased so as to increase, for instance to W1 as seen in FIG. 10, or decrease the preselected width between the dual inlet gates 24, 26 in the opened position. This adjustment is used to change the width of the opening between the dual inlet gates 24, 26 to match or correspond to the width of the animals A that are to be weighed.

Figure 5:
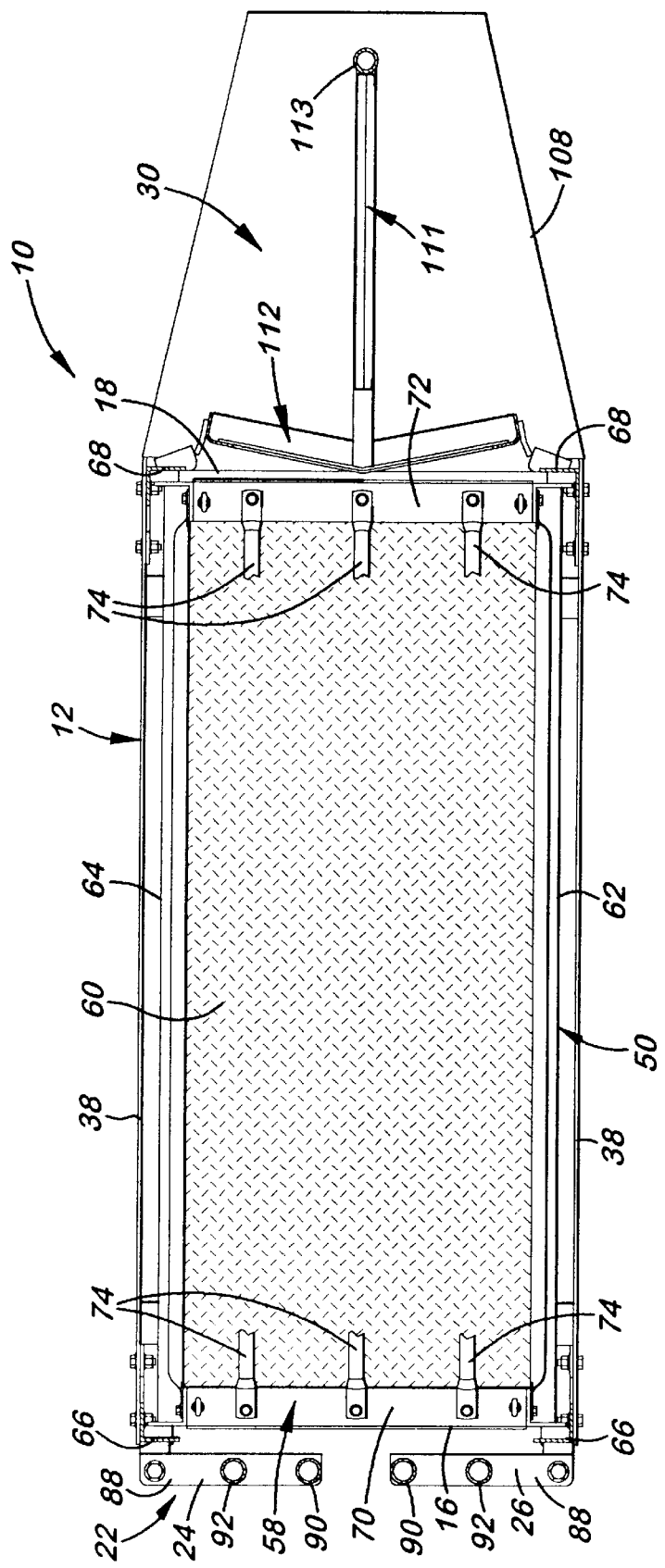
FIG. 5 is an enlarged horizontal sectional view of the apparatus taken along line 5—5 of FIG. 1.

Referring to FIGS. 1, 3, 6, 7 and 13–16, the outlet sort gate 30 of the apparatus 10 is pivotally mounted to the frame 12 and is disposed adjacent to the outlet opening 18 of the weighing station 14 for undergoing pivotal movement from a centered closed position, as seen in FIGS. 5, 13 and 14, closing the outlet opening 18 of the weighing station 14 wherein the animal A is prevented from exiting the weighing station 14, to a first opened position, as seen in FIG. 15, relative to the outlet opening 18 of the weighing station 14 wherein the animal A which has weighed "light" is allowed to exit the weighing station 14 and is sorted into a feeding pen C, as seen in FIG. 18, or a second opened position, as seen in FIG. 16, relative to the outlet opening 18 of the weighing station 14 wherein an animal A which has weighed "heavy" is allowed to exit the weighing station 14 through the outlet opening 18 and is sorted into a staging pen D. More particularly, the frame 12 further includes an upper extension 106 and a lower deck 108 both fixedly attached to and extending outwardly from respective upper and lower ends of the upright frame members 44 of the frame 12 at the exit end 48 of the frame 12. As best seen in FIG. 1, the outlet sort gate 30 is pivotally mounted to and extends between the upper extension 106 and the lower deck 108.

Figure 7:
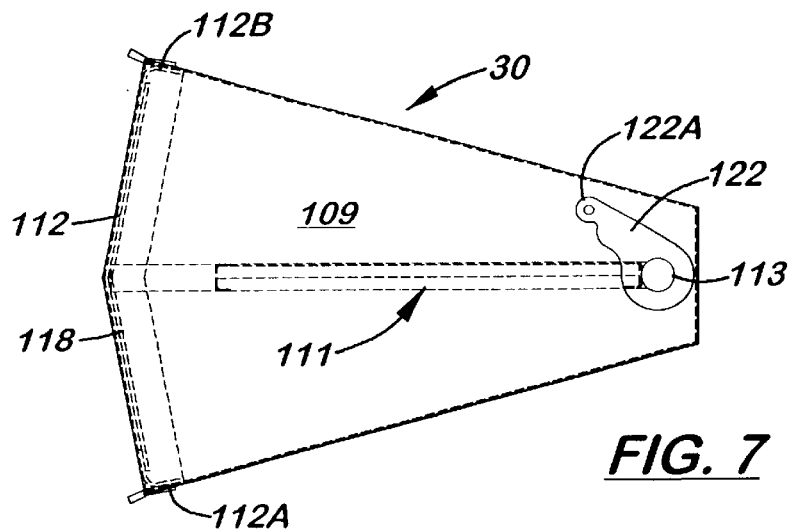
FIG. 7 is a top plan view of the outlet sort gate as seen along line 7—7 of FIG. 6.
Figure 6:
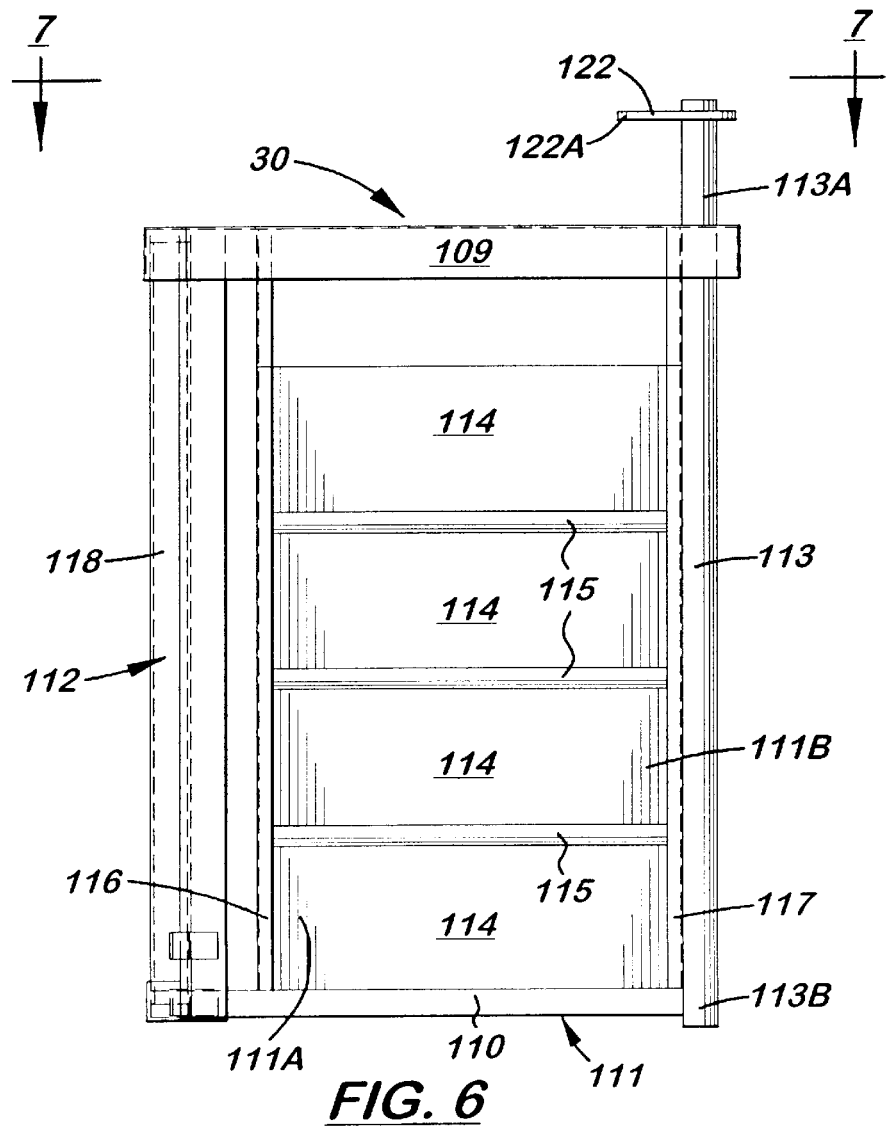
FIG. 6 is an enlarged side elevational view of the outlet sort gate of the apparatus shown removed from the apparatus.
Figure 8:
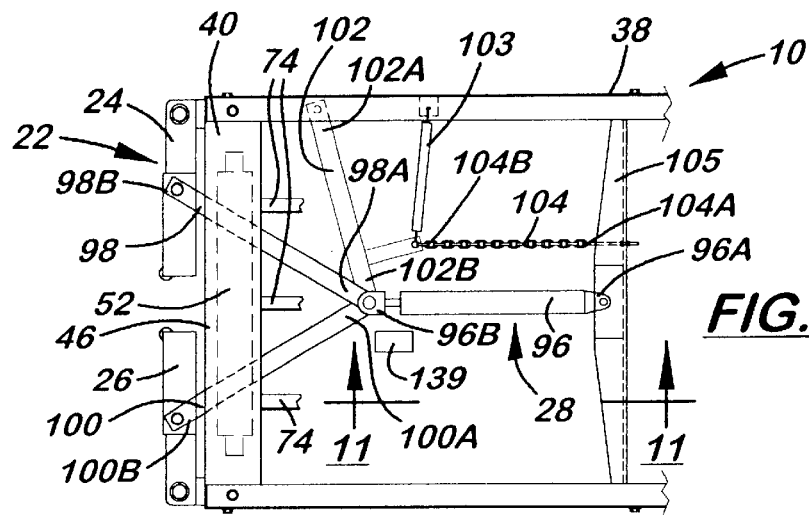
FIG. 8 is a fragmentary top plan view of the apparatus showing a retracted condition of a first actuator mechanism in which the dual inlet gates are held in the closed position.

As seen in FIG. 1, and best seen in FIGS. 6 and 7, the outlet sort gate 30 is in the form of a generally rectangular shaped framework structure comprised of upper and lower, horizontally extending frame members 109, 110; a central panel portion 111; an end portion 112 disposed on one side edge 111A of the central panel portion 111 and extending between and interconnected to the upper and lower frame members 109, 110; and a hollow pivot shaft 113 disposed on the opposite side edge 111B of the central panel portion 111. The upper frame member 109 is somewhat trapezoidal shaped (see FIG. 7) whereas the lower frame member 110 is a longitudinally extending member. The pivot shaft 113 is interconnected to the upper and lower frame members 109, 110 and, as best seen in FIG. 6, extends a short distance above the upper frame member 109. In the preferred embodiment, the central panel portion 111 is in the form of a solid, relatively flat, panel member 114 with stiffening cross-braces 115, however, the central panel portion 111 could also be an open panel structure (not shown). Attached to each side edge of the panel member 114 is an upstanding channel member 116, 117 that is attached to and extends between the upper and lower frame members 109, 110. For added support, the one channel member 117 is tack welded to the side of the upright pivot shaft 113. The end portion 112 of the outlet sort gate 30 extends in transverse relation to the central panel portion 111 and has a pair of opposite ends 112A, 112B. The outlet sort gate 30 has referred to earlier as having a generally T-shaped configuration since the end portion 112 extends in a transverse relation to the central portion 111 with the central portion 111 representing the upright, long leg of the "T" and the end portion 112 representing the shorter, top cross leg of the "T". Thus, it should be understood herein that any reference to the outlet sort gate 30 as having a generally T-shaped configuration is not limited to any specific "T" shape, but would also include other such type configurations wherein the end portion 112 is in a generally transverse relationship to the central portion 111, such as where the end portion 112 may be in the form of an arc or in angled components. Preferably, the end portion 112 of the outlet sort gate 30 is a rigid screen 118 having a shallow V-shaped configuration and is designed to be disposed across and close the outlet opening 18 of the weighing station 14 when the outlet sort gate 30 is at the closed centered position. For pivotally mounting the outlet sort gate 30 between the upper extension 106 and the lower deck 108 (as shown in FIG. 1), a short stub shaft 119 is provided on the lower deck 108 and a bearing assembly 120 is provided on the upper extension 106. The bearing assembly 120 retains and supports the upper end 113A of the pivot shaft 113 of the outlet sort gate 30 whereas the lower end 113B of the hollow pivot shaft 113 of the outlet sort gate 30 extends over the short stub shaft 119 on the lower deck 30 and is rotatably supported thereon by a bushing 121. The outlet sort gate 30 is pivotally moved and disposed to one side of the outlet opening 18 of the weighing station 14 when in the first opened position relative to the outlet opening 18, whereas the outlet sort gate 30 is pivotally moved and disposed to an opposite side of the outlet opening 18 of the weighing station 14 when in the second opened position relative to the outlet opening 18.

The second actuator mechanism 32 of the apparatus 10 extends between and connects to the upper extension 106 of the frame 12 and the outlet sort gate 30. The second actuator mechanism 32 is actuatable to move the outlet sort gate 30 between the centered closed position and the first or second opened positions to correspondingly prevent and permit exit of the animal A through the outlet opening 18 of the weighing station 14 from the passageway 20 thereof to exterior heavy and light livestock sort areas D, C. More particularly, the second actuator mechanism 32 includes a crank arm 122, a double extendable and retractable actuator 124, such as a double acting pneumatic cylinder, and an elongated spring 126. The crank arm 122 is rigidly attached to and extends outwardly from the upper end 113A of the pivot shaft 113 The double actuator 124 is pivotally coupled at one end 124A to one end of the upper extension 106 and pivotally coupled at an opposite end 124B to an outer end 122A of the crank arm 122 such that extension of the double actuator 124 to an extended condition moves the outlet sort gate 30 from the centered closed position to the second opened position, as seen in FIG. 15, whereas extension of the double actuator 124 to a retracted condition moves the outlet sort gate 30 from the centered closed position to the second opened position, as seen in FIG. 16. The spring 126 is coupled to and extends between the double actuator 124 and the upper extension 106 of the frame 12 which is stretched from a neutral position to a stretched position by both the extension and retraction of the double actuator 124 to the corresponding extended and retracted conditions.

Figure 4:
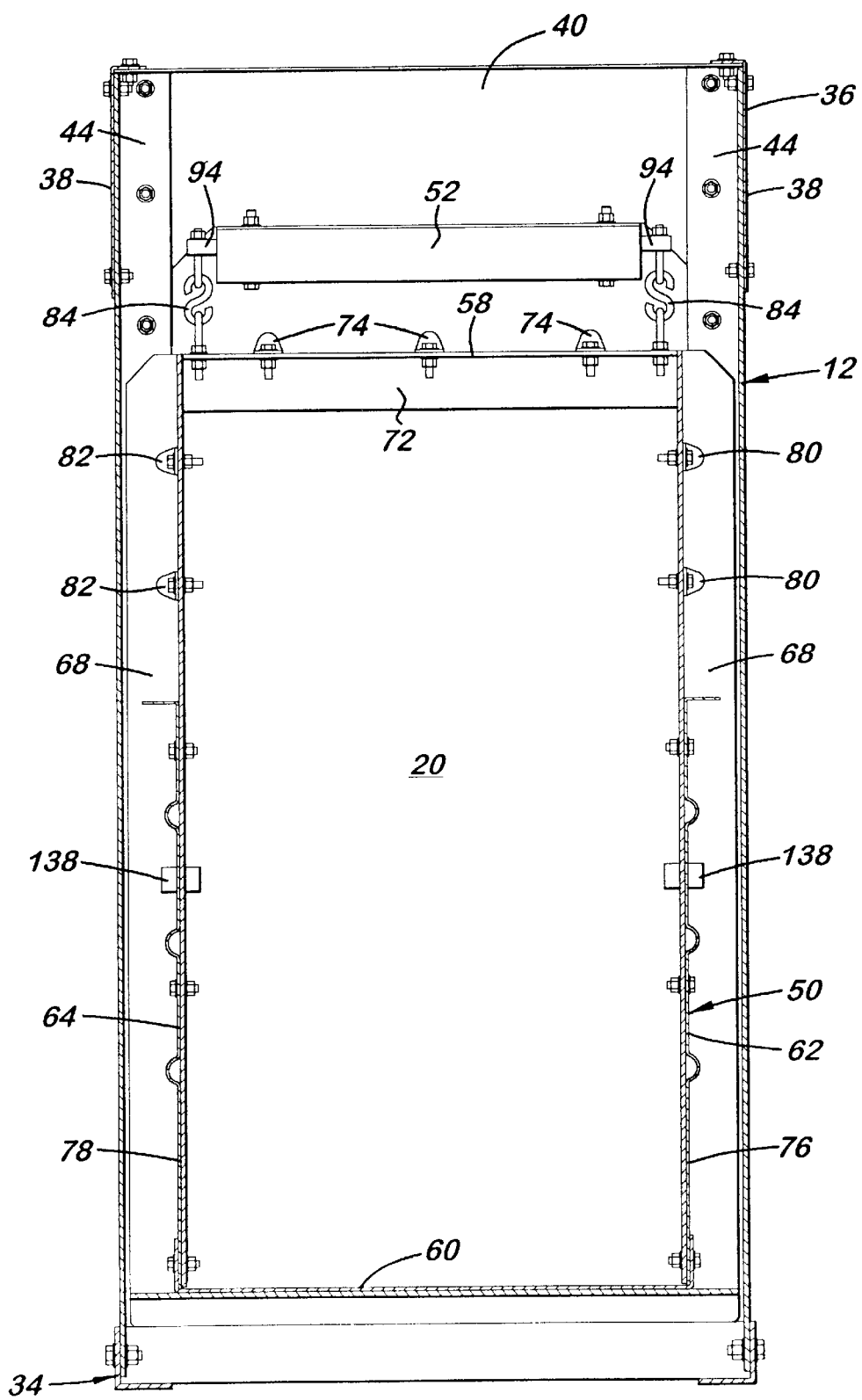
FIG. 4 is an enlarged vertical sectional view of the apparatus taken along line 4—4 of FIG. 1.
Figure 17:
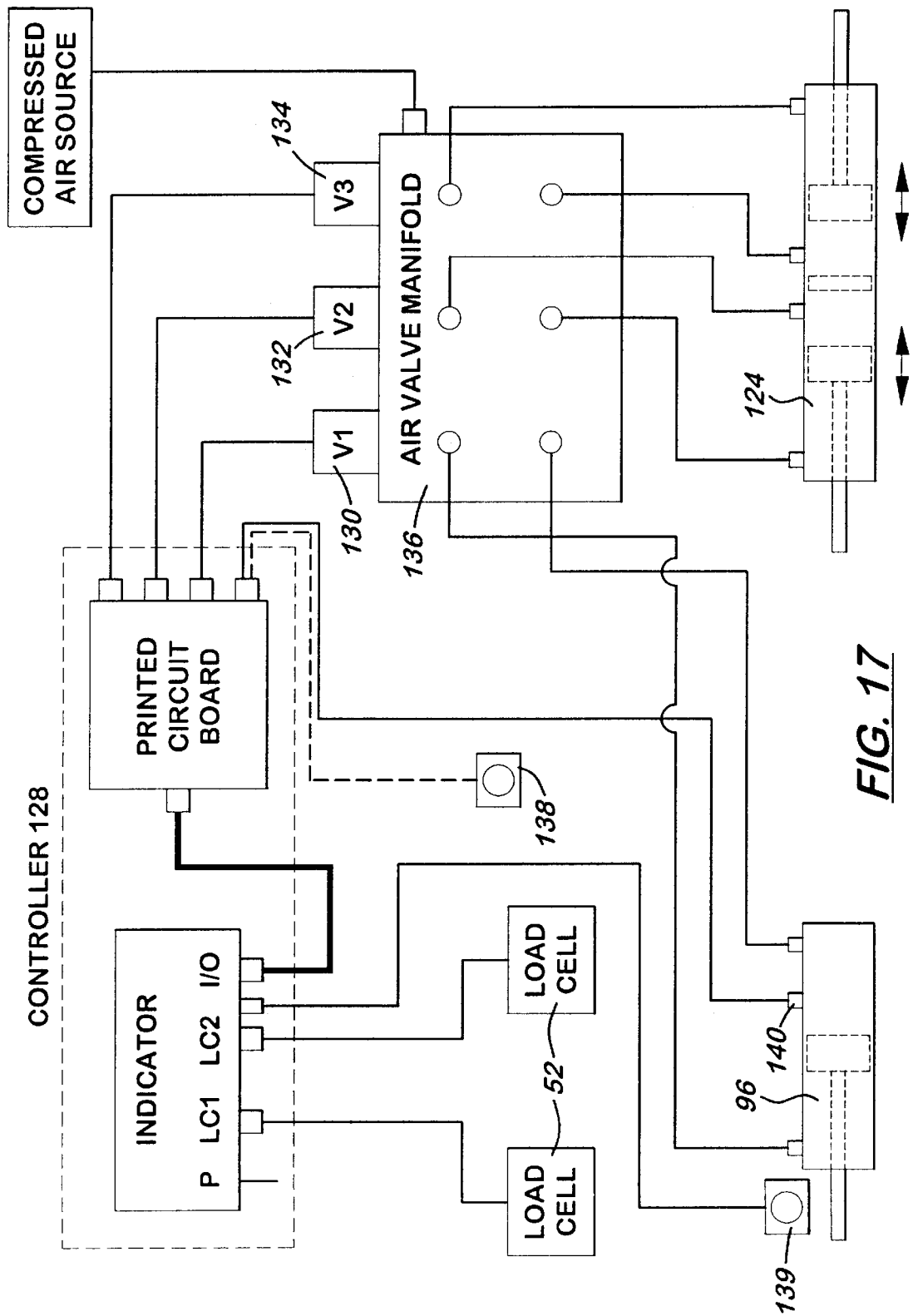
FIG. 17 is a diagram of the interconnections between the various control elements of the apparatus.

Referring to FIG. 17, there is illustrated control means which includes a controller 128 connected to the load cells 52 for controlling operation of the weighing station 14 and to first, second and third air valves 130, 132, 134 on an air valve manifold 136 which, in turn, are connected to the single and double actuators 96, 124 for controlling the opening and closing of the dual inlet gates 24, 26 and the outlet sort gate 30 in response to the operation of the weighing station 14. At the start of operation of the apparatus 10 as seen in FIG. 13, the dual inlet gates 24, 26 are at the opened position with the single actuator 96 of the first actuator mechanism 28 at its extended position, the outlet sort gate 30 is in the centered closed position with the double actuator 124 of the second actuator mechanism 32 at its retracted position, and the weighing station 14 in an idle condition waiting for a pig A to enter between the dual inlet gates 24, 26 and through the inlet opening 16 of the cage 50. When an animal A enters the inlet opening 16 and starts to get on the bottom platform 60 of the cage 50, the controller 128 monitors the weight signals received from the load cells 52 of the weighing station 14. When a preset level or criteria stored in the controller 128 is met, or optionally if a detector 138 detects the presence of the animal A, the controller 128 will cause actuation of the single actuator 96 to start to move to its retracted condition via the first air valve 130 which will start to close the dual inlet gates 24, 26 to their fully closed position, as seen in FIG. 14. The optional detector 138 can be positioned along and on the opposite sidewalls 62, 64 of the cage 50 (as seen in FIGS. 1 and 4) and utilized to detect that an animal A has entered a sufficient distance into and within the cage 50 so as to start to close the dual inlet gates 24, 26 rather than utilizing a predetermined weight criteria to start to close the dual inlet gates 24, 26 as is explained above. By way of example only, the detector 138 can be a photo-sensor optical sensor, temperature sensor, sonar sensor, weight sensor, or the like; any such detecting/sensing device that can detect the presence of an animal within the cage 50 so as to accomplish the desired result. In the preferred embodiment, only after the single actuator 96 has retracted to a predetermined position, a solid state magnetic switch 140 on the single actuator 96 will sense this and send a signal to the controller 128 which, in turn, starts the process of capturing the actual live weight of the animal A standing on the bottom platform 60 of the cage 50. For reliability in the weighing process, it is imperative that the dual inlet gates 24, 26 be fulled closed. Thus, in the preferred embodiment, a sensor 139 has been provided in association with the single actuator 96 as diagrammatically represented in FIGS. 8–10 and 14–17 so as to ensure that the single actuator 96 has retracted to a predetermined position and thus ensurance that the dual inlet gates 24, 26 have been moved to a fulled closed position. The sensor 139 can be any conventional mechanical or photoelectric device which senses the position or movement distance of the actuator or the arm of the actuator. In like manner, the sensor 139 could be positioned adjacent the dual inlet doors 24, 26 (not particularly shown) to sense their position in a fully closed condition and thereby to ensure that the inlet doors 24, 26 are fully closed. When the weight has been captured based on certain programmable set points, either a light or heavy output will be sent to the second and third air valves 132, 134 which will cause actuation of the double actuator 124 so as to either pivotally move the outlet sort gate 30 to the first opened position, as seen in FIG. 15 or to the second opened position, as seen in FIG. 16. At this point the controller 128 continues to monitor the weight of the animal A as it moves from the cage 50 through the outlet opening 18 so as to enable the closing of the outlet sort gate 30 when it has detected that the animal A has exited the apparatus 10. If after a preset time, the animal A has not completely left, the controller 128 will cause the outlet sort gate 32 to close partially, attempting to bump the animal A, if only partway out urging it on. Additional procedures are enabled by the controller 128 to operate the output sort gate 30 so as to appropriately handle an animal A should a stubborn animal be encountered. For example, if after a given time interval and the weight of the animal A is below a predetermined set value which may indicate that the animal A has backed out of the weighing cage 50, the dual inlet gates 24, 26 will reopen to allow the animal A to re-enter the cage 50. Also, if the controller 128, after receiving a signal to close the dual inlet gates 24, 26, haven't received a signal, within a set time interval, from the sensor 139 that the dual inlet gates 24, 26 are fully closed, the outlet sort gate 30 will open to the light weight side and the controller 128 will automatically reset after a give time period to repeat the initial weighing process by opening the dual inlet gates 24, 26 and closing the outlet sort gate 30. Further, during the weight calculating process and after a given time interval, if the calculated weight of the animal is determined to be greater than a set weight point, the controller 128 will automatically open the outlet sort gate 30 to the light weight side because this extra heavy weight value may be an indication that more then one animal A has gotten into the cage 30 at the same time. And still further, during the weighing process, if the controller 128 during the weight calculations cannot lock on the weight of the animal A after a given time interval, then the controller 128 will cause the outlet sort gate 30 to open to the light weight side. In essence, should any pre-anticipated problems be encountered during the weighing process, the controller 128 automatically defaults the outlet sort gate 30 to the light weight side so that the animal can be recycled through the process and that only accurate and reliable weight readings are recorded and that only the proper weight animals are sorted to the heavy weight or market pen area side of the sort gate 30.

FIG. 18 has been merely provided to show an example of the apparatus 10 employed in a typical weighing and sorting environment wherein pigs/hogs are automatically weighed and sorted in accordance with their weight. The apparatus 10 is utilized in an overall pig/hog management system wherein the hogs are trained to move around a large pen area that has now been divided into smaller designated areas, such as feeding and loafing areas, by gates, one-way gates, and the weighing and sorting apparatus 10 of the present invention. With the arrangement shown, the hogs must pass through the apparatus 10 to get to and from one designated area to another. After a given time period, these hogs become accustomed to passing through apparatus 10 and are very relaxed and calm in this procedure which is very beneficial when these animals are later weighed and sorted by weight for market in thereby eliminating various problems experienced in the past in sorting out the hogs for market.

It is thought that the present invention and its advantages will be understood from the foregoing description and it will be apparent that various changes may be made thereto without departing from the spirit and scope of the invention or sacrificing all of its material advantages, the form hereinbefore described being merely preferred or exemplary embodiment thereof.

We claim:

1. A livestock weighing and sorting apparatus, comprising:

(a) a frame having opposite entry and exit ends;
   (b) a weighing station supported by said frame and having an inlet opening and an outlet opening spaced apart from one another and disposed adjacent to said respective opposite entry and exit ends of said frame, said weighing station defining a passageway extending between said inlet and outlet openings and said entry and exit ends for permitting an animal to go through said passageway from said respective inlet opening and entry end to said respective outlet opening and exit end of said weighing station and frame and to be weighed as the animal is present in said weighing station;

(c) dual inlet gates mounted to said frame side-by-side one another and disposed at said entry end of said frame and adjacent to said inlet opening of said weighing station for undergoing pivotal movement toward and away from each other between opened and closed positions relative to said inlet opening of said weighing station and said entry end of said frame;

(d) a first actuator mechanism coupled between said frame and said dual inlet gates and being actuatable to move said dual inlet gates between said opened and closed positions to correspondingly permit and prevent entry of an animal from a livestock supply area through said entry end of said frame and said inlet opening of said weighing station into said passageway of said weighing station;

(e) an outlet sort gate mounted to said frame and disposed adjacent to said outlet opening of said weighing station for undergoing pivotal movement between closed and opened positions relative to said outlet opening of said weighing station and said exit end of said frame;

(f) a second actuator mechanism coupled between said frame and said outlet sort gate and being actuatable to move said outlet gate between said closed and opened positions to correspondingly prevent and permit exit of the animal through said outlet opening of said weighing station from said passageway thereof to exterior heavy and light livestock sort areas; and (g) means for controlling operation of said weighing station and actuation of said first and second actuator mechanisms and thereby opening and closing of said inlet gates and outlet sort gate in response to operation of said weighing station.

2. The apparatus as recited in claim 1, wherein said frame has a lower framework, an upper framework, and pairs of upright frame members spaced from one another and extending upright between and fixedly connected with opposite pairs of corners of said lower and upper frameworks so as to form said opposite entry and exit ends of said frame.

3. The apparatus as recited in claim 1, wherein said weighing station includes a cage having opposite ends, a top, a bottom platform and a pair of opposite lateral sides extending upright between said top and bottom and spaced apart from one another, said inlet and outlet openings being defined at said opposite ends of said cage with said passageway extending over said bottom platform between said inlet and outlet openings for permitting the animal to be weighed as the animal is present on said bottom platform.

4. The apparatus as recited in claim 3, wherein said weighing station further includes a plurality of load cells, at least one load cell being mounted to said frame adjacent to said entry end and at least one load cell being mounted to said frame adjacent to said exit end, said cage adjacent to said opposite ends thereof being supported from said load cells.

5. The apparatus as recited in claim 3, wherein said dual inlet gates are respectively pivotally mounted to one of said pairs of upright frame members disposed at said entry end of said frame and adjacent to said inlet opening of said cage.

6. The apparatus as recited in claim 5, wherein each of said dual inlet gates includes:

upper and lower mounting members pivotally mounted to one of said upright frame members of said frame; and a pair of upright tubular members extending between and attached to said upper and lower mounting members.

7. The apparatus as recited in claim 1, wherein said first actuator mechanism includes:

a single extendable and retractable actuator having a pair of opposite ends and being coupled at one of said opposite ends to said frame, said dual inlet gates being moved to said closed position in response to actuation of said single actuator to a retracted condition and said dual inlet gates being moved to said opened position in response to actuation of said single actuator to an extended condition; and a pair of links each having a pair of opposite ends and being pivotally coupled at one of said opposite ends to the other of said opposite ends of said single actuator and pivotally coupled at the other of said opposite ends to one of said dual inlet gates.

8. The apparatus as recited in claim 7, wherein said first actuator mechanism further includes:

a stabilizer link having a pair of opposite ends and being pivotally coupled at one of said opposite ends to said frame and pivotally coupled at the other of said opposite ends to said other of said opposite ends of said single acuator; and an inelastic flexible member disposed along said single actuator and having a pair of opposite ends, said inelastic flexible member being connected at one of said opposite ends to said frame and at the other of said opposite ends to said stabilizer link so as to assume a slack condition in response to said single actuator being actuated to said retracted condition and a taut condition in response to said single actuator being actuated to said extended condition such that inelastic flexible member has a predetermined length between said ends thereof when in said taut condition which defines a preselected width between said dual inlet gates in said opened position.

9. The apparatus as recited in claim 8, wherein the predetermined length between said ends of said inelastic flexible member can be increased or decreased so as to increase or decrease the preselected width between said dual inlet gates in said opened position.

10. The apparatus as recited in claim 1, wherein said means for controlling operation includes detection means for detecting an animal within said passageway extending between said inlet and outlet openings and then upon detection, actuation of said first actuator mechanism to move said dual inlet gates from said open to closed position.

11. The apparatus as recited in claim 10, wherein said means for controlling operation includes detection means for detecting an animal within said passageway extending between said inlet and outlet openings and then upon detection, actuation of said first actuator mechanism to move said inlet gate assembly from said open to closed position.

12. The apparatus as recited in claim 10, wherein said means for controlling operation includes sensor means for ensuring said inlet gate assembly has been moved to said closed position by said first actuator mechanism.

13. The apparatus as recited in claim 1, wherein said means for controlling operation includes sensor means for ensuring said dual inlet gates have been moved to said closed position by said first actuator mechanism.

14. A livestock weighing and sorting apparatus, comprising:
(a) a frame having opposite entrance and exit ends;
(b) a weighing station supported by said frame and having an inlet opening and an outlet opening spaced apart from one another and disposed adjacent to said respective opposite entry and exit ends of said frame, said weighing station defining a passageway extending between said inlet and outlet openings and said entry and exit ends for permitting an animal to go through said passageway from said respective inlet opening and entry end to said respective outlet opening and exit end of said weighing station and frame and to be weighed as the animal is present in said weighing station;
(c) an inlet gate assembly mounted to said entry end of said frame and adjacent to said inlet opening of said weighing station for undergoing movement between opened and closed positions relative to said inlet opening of said weighing station;
(d) a first actuator mechanism coupled between said frame and said inlet gate assembly and being actuatable to move said inlet gate assembly between said opened and closed positions to correspondingly permit and prevent entry of the animal from a livestock supply area through said entry end of said frame and said inlet opening of said weighing station into said passageway thereof;
(e) an outlet sort gate mounted to said frame and disposed adjacent to said outlet opening of said weighing station for undergoing pivotal movement from a centered closed position to a first opened position or a second opened position relative to said outlet opening of said weighing station and said closed centered position, said outlet sort gate including a central panel portion having a pair of opposite ends, a pivot shaft disposed at one of said opposite ends for pivotal mounting of said outlet sort gate, and an end portion disposed at another of said opposite ends and extending in transverse relation to said central panel portion, said end portion being disposed across said outlet opening of said weighing station when said outlet sort gate is at said closed centered position, said outlet sort gate being pivotally moved and disposed to one side of said outlet opening when in said first opened position relative to said outlet opening, said outlet sort gate being pivotally moved and disposed to an opposite side of said outlet opening when in said second opened position relative to said outlet opening;
(f) a second actuator mechanism coupled between said frame and said outlet sort gate and being actuatable to move said outlet gate between said centered closed position and said first or second opened positions to correspondingly prevent and permit exit of the animal through said outlet opening of said weighing station from said passageway thereof to exterior heavy and light livestock sort areas; and
(g) means for controlling operation of said weighing station and actuation of said first and second actuator mechanisms and thereby opening and closing of said inlet gate assembly and outlet sort gate in response to operation of said weighing station.

15. The apparatus as recited in claim 14, wherein said frame has a lower framework, an upper framework, and pairs of upright frame members spaced from one another and extending upright between and fixedly connected with opposite pairs corners of said lower and upper frameworks so as to form opposite entry and exit ends of said frame.

16. The apparatus as recited in claim 15, wherein said weighing station further includes a cage having opposite ends, a top, a bottom platform and a pair of opposite lateral sides extending upright between said top and bottom and spaced apart from one another, said opposite ends of said cage defining said inlet opening and said outlet opening spaced apart from one another and disposed adjacent to said respective opposite entry and exit ends of said frame, said bottom platform and lateral sides of said cage defining said passageway extending between said inlet and outlet opening and said entry and exit ends permitting an animal to go through said passageway from said respective inlet opening and entry end to said respective outlet opening and exit end of said cage and frame and to be weighed as the animal is present on said bottom platform of said cage.

17. The apparatus as recited in claim 16, wherein said frame further includes an upper extension and a lower deck fixedly attached to and extending outwardly from said exit end of said frame, said outlet sort gate being pivotally mounted to and extending between said upper extension and said lower deck.

18. The apparatus as recited in claim 17, wherein:
said end portion of said outlet sort gate is a rigid screen; and
said central panel portion is a solid panel member with stiffening ribs.

19. The apparatus as recited in claim 18, wherein said second actuator mechanism includes a crank arm rigidly attached to and extending outwardly from an upper end of said pivot shaft.

20. The apparatus as recited in claim 19, wherein said second actuator mechanism further includes a double extendable and retractable actuator pivotally coupled at one end to an end of said upper extension and pivotally coupled at an opposite end to an outer end of said crank arm such that extension of said double actuator to an extended condition moves said outlet sort gate from said centered closed position to said first opened position whereas retraction of said double actuator to a retracted condition moves said outlet sortgate from said centered closed position to said second opened position.

21. The apparatus as recited in claim 20, wherein second actuator mechanism still further includes a spring coupled to and extending between said double actuator and said upper extension of said frame which is stretched from a neutral position to a stretched position by both extension and retraction of said double actuator to said corresponding extended and retracted conditions.

22. A livestock weighing and sorting apparatus, comprising:
(a) a frame having a lower framework, an upper framework and pairs of upright frame members spaced from one another and extending upright between and fixedly connected with opposite pairs corners of said lower and upper frameworks so as to form opposite entry and exit ends of said frame;
(b) a weighing station having an inlet opening and an outlet opening spaced apart from one another and disposed adjacent to said respective opposite entry and exit ends of said frame, said weighing station defining a passageway extending between said inlet and outlet openings and said entry and exit ends for permitting an animal to go through said passageway from said respective inlet opening and entry end to said respective outlet opening and exit end of said weighing station and frame and to be weighed as the animal is present in said weighing station, said weighing station including (i) a cage having opposite ends, a top, a bottom platform and a pair of opposite lateral sides extending upright between said top and bottom and spaced apart from one another, said inlet and outlet openings being defined at said opposite ends of said cage and said passageway extending over said bottom platform for permitting the animal to be weighed as the animal is present on said bottom platform, and (ii) a plurality of load cells, at least one load cell being mounted to said frame adjacent to said entry end and at least one load cell being mounted to said frame adjacent to said exit end, said cage adjacent to said opposite ends thereof being supported from said load cells;

(c) dual inlet gates respectively pivotally mounted to one of said pairs of upright frame members disposed at said entry end of said frame adjacent to said inlet opening of said cage for undergoing movement toward and away from each other between opened and closed positions relative to said inlet opening of said cage;

(d) a first actuator mechanism coupled between said frame and said dual inlet gates and being actuatable to move said dual inlet gates between said opened and closed positions to correspondingly permit and prevent entry of the animal from a livestock supply area through said entry end of said frame and said inlet opening of said cage into said passageway thereof;

(e) an outlet sort gate mounted to said frame and disposed adjacent to said outlet opening of said weighing station for undergoing pivotal movement from a centered closed position to a first opened position or a second opened position relative to said outlet opening of said weighing station and said closed centered position, said outlet sort gate including a central panel portion having a pair of opposite ends, a pivot shaft disposed at one of said opposite ends for pivotal mounting of said outlet sort gate, and an end portion disposed at another of said opposite ends and extending in transverse relation to said central panel portion, said end portion being disposed across said outlet opening of said weighing station when said outlet sort gate is at said closed centered position, said outlet sort gate being pivotally moved and disposed to one side of said outlet opening when in said first opened position relative to said outlet opening, said outlet sort gate being pivotally moved and disposed to an opposite side of said outlet opening when in said second opened position relative to said outlet opening;

(f) a second actuator mechanism coupled between said frame and said outlet sort gate and being actuatable to move said outlet gate between said centered closed position and said first or second opened positions to correspondingly prevent and permit exit of the animal through said outlet opening of said weighing station from said passageway thereof to exterior heavy and light livestock sort areas; and (g) means for controlling operation of said cage and actuation of said first and second actuator mechanisms and thereby opening and closing of said inlet gate and outlet sort gate in response to operation of said cage.

23. The apparatus as recited in claim 22, wherein each of said dual inlet gates includes:
upper and lower mounting members pivotally mounted to one of said upright frame members of said frame; and
a pair of upright tubular members extending between and attached to said upper and lower mounting members.

24. The apparatus as recited in claim 22, wherein said first actuator mechanism includes:
a single extendable and retractable actuator having a pair of opposite ends and being coupled at one of said opposite ends to said frame, said dual inlet gates being moved to said closed position in response to actuation of said single actuator to a retracted condition and said dual inlet gates being moved to said opened position in response to actuation of said single actuator to an extended condition; and
a pair of links each having a pair of opposite ends and being pivotally coupled at one of said opposite ends to the other of said opposite ends of said single actuator and pivotally coupled at the other of said opposite ends to one of said dual inlet gates.

25. The apparatus as recited in claim 24, wherein said first actuator mechanism further includes:
a stabilizer link having a pair of opposite ends and being pivotally coupled at one of said opposite ends to said frame and pivotally coupled at the other of said opposite ends to said other of said opposite ends of said single actuator; and
an inelastic flexible member disposed along said single actuator and having a pair of opposite ends, said inelastic flexible member being connected at one of said opposite ends to said frame and at the other of said opposite ends to said stabilizer link so as to assume a slack condition in response to said single actuator being actuated to said retracted condition and a taut condition in response to said single actuator being actuated to said extended condition such that inelastic flexible member has a predetermined length between said ends thereof when in said taut condition which defines a preselected width between said dual inlet gates in said opened position.

26. The apparatus as recited in claim 25, wherein the predetermined length between said ends of said inelastic flexible member can be increased or decreased so as to increase or decrease the preselected width between said dual inlet gates in said opened position.

27. The apparatus as recited in claim 22, wherein said second actuator mechanism includes a crank arm rigidly attached to and extending outwardly from an upper end of said pivot shaft.

28. The apparatus as recited in claim 27, wherein said second actuator mechanism further includes a double extendable and retractable actuator pivotally coupled at an end to said upper extension and pivotally coupled at an opposite end to an outer end of said crank arm such that extension of said actuator to an extended condition moves said outlet sort gate from said centered closed position to said first opened position whereas retraction of said actuator to a retracted condition moves said outlet sort gate from said centered closed position to said second opened position.

29. The apparatus as recited in claim 28, wherein second actuator mechanism still further includes a spring coupled to and extending between said double actuator and said upper extension of said frame which is stretched from a neutral position to a stretched position by both extension and retraction of said double actuator to said corresponding extended and retracted conditions.

30. The apparatus as recited in claim 22, wherein said means for controlling operation includes detection means for detecting an animal within said passageway extending between said inlet and outlet openings and then upon detection, actuation of said first actuator mechanism to move said dual inlet gates from said open to closed position.

31. The apparatus as recited in claim 22, wherein said means for controlling operation includes sensor means for ensuring said dual inlet gates have been moved to said closed position by said first actuator mechanism.

32. A method of automatically weighing and sorting livestock by weight by permitting an animal to pass through a livestock weighing and sorting apparatus that includes a weighing station having an inlet opening and an outlet opening defining a passageway extending therethrough and a weighing scales associated therewith, dual inlet gates disposed at said inlet opening and mounted for undergoing pivotal movement by a first actuator mechanism toward and away from each other between an open position wherein an animal may move forwardly through the inlet opening and into the passageway and a closed position relative to said inlet opening wherein an animal is prevented from moving rearwardly from the passageway once within the passageway, and an outlet sort gate disposed adjacent to said outlet opening and mounted for undergoing pivotal movement by a second actuator mechanism between a closed position wherein an animal within the passageway is prevented to exit the passageway through the exit opening and an open position relative to said outlet opening wherein an animal within the passageway is permitted to exit the passageway forwardly through the outlet opening, comprising the steps of:

(a) actuating said first actuator mechanism to pivotally move said dual inlet gates away from one another to an open position and actuating said second actuator mechanism to a closed position so as to permit an animal to pass through said inlet opening and into said passageway and to be prevented from exiting said passageway by moving further forwardly through said outlet opening;

(b) detecting the presence of an animal within said passageway;

(c) actuating said first actuator mechanism to pivotally move said dual inlet gates toward one another from an open to a closed position so as to trap an animal within said passageway between said closed inlet and outlet openings;

(d) ensuring said dual inlet doors have been moved by said first actuator mechanism to said closed position;

(e) performing the weighing process of the animal within said passageway by operation of the weighing scales for a predetermined time interval to calculate the weight of the animal and record the weight measurement;

(f) after the weight of the animal has been calculated and recorded, actuating said second actuator mechanism to pivotally move said outlet sort gate from said closed position to an open position so as to permit the weighed animal to exit said passageway through said outlet opening; and (g) repeating steps (a) through (f) above for weighing successive animals, one at a time.

33. The method as recited in claim 32, wherein said step of detecting the presence of an animal within said passageway includes physically detecting the presence of an animal by a detector device employed with said weighing station.

34. The method as recited in claim 32, wherein said step of detecting the presence of an animal within said passageway includes detecting a predetermined weight value in said passageway by the weighing scales.

35. The method as recited in claim 32, wherein said step of ensuring said dual inlet doors have been moved by said first actuator mechanism to said closed position includes sensing a predetermined movement of said first actuator mechanism by a sensor disposed in association with said first actuator mechanism.

36. The method as recited in claim 32, wherein said step of ensuring said dual inlet doors have been moved by said first actuator mechanism to said closed position includes sensing the closed position of said doors by a sensor disposed in association with said dual inlet doors.

* * * * *